United States Patent [19]
Roberts et al.

[11] Patent Number: 5,951,204
[45] Date of Patent: Sep. 14, 1999

[54] PROCESS TO DECONTAMINATE SOIL

[75] Inventors: Charles T. Roberts, Richardson; Terry J. Moore, Plano, both of Tex.

[73] Assignee: Atlantic Richfield Company, Los Angeles, Calif.

[21] Appl. No.: 08/976,136

[22] Filed: Nov. 18, 1997

[51] Int. Cl.[6] .................................................. B09C 1/02
[52] U.S. Cl. ........................ 405/128; 134/10; 210/901; 588/249
[58] Field of Search ....................... 134/10, 42; 210/901, 210/902; 405/50, 128, 258, 270; 588/249, 255, 261

[56] References Cited

U.S. PATENT DOCUMENTS

| | | | |
|---|---|---|---|
| 4,358,221 | 11/1982 | Wickberg | 405/128 X |
| 4,465,402 | 8/1984 | Ter Meulen | 405/128 X |
| 4,483,716 | 11/1984 | Heller | 588/249 X |
| 4,582,611 | 4/1986 | Wang | 405/128 X |
| 4,611,950 | 9/1986 | Russomano | 405/128 |
| 4,749,479 | 6/1988 | Gray | 210/901 X |
| 4,817,647 | 4/1989 | Nelson | 134/42 X |
| 5,035,437 | 7/1991 | Rose | 405/128 |
| 5,037,240 | 8/1991 | Sherman | 405/128 |
| 5,492,434 | 2/1996 | Adams et al. | 405/270 X |
| 5,512,176 | 4/1996 | Blair | 210/902 X |
| 5,639,936 | 6/1997 | Corte | 405/128 X |
| 5,794,698 | 8/1998 | Roberts | 405/128 X |

OTHER PUBLICATIONS

"AEF Non–Woven Staple Fiber for AEF Absorbents", CAS No.: (9003–07–0), Material Safety Data Sheet, American Engineering Fabrics (undated).

Primary Examiner—George Suchfield
Attorney, Agent, or Firm—F. Lindsey Scott

[57] ABSTRACT

A process for removing water-soluble contaminates from soil includes laying a mat over and in contact with the contaminated soil, applying water to the soil, permitting the water to be transferred from the soil to the mat, permitting the contaminants to be carried via the water into the mat, and permitting the water to be evaporated from the mat so that the contaminants precipitate in the mat.

15 Claims, 3 Drawing Sheets

PROCESS TO DECONTAMINATE SOIL

FIELD OF THE INVENTION

The invention relates generally to a process to decontaminate soil and, more particularly, to a process to remove contaminates such as salt from soil in arid regions.

BACKGROUND OF THE INVENTION

Many activities associated with oil and gas operations contaminate the surface of nearby soil with water-soluble contaminates such as salts, acids, bases, metals, and the like. Such activities include produced water spills, $SO_2$ scrubber emissions associated with steam generation, and the like. Salt contamination, particularly within the top sixteen inches of the soil, ie., shallow salt contamination, is detrimental to soil for a number of different reasons. For example, shallow salt contamination inhibits the growth of vegetation in the soil, and accelerates erosion of the soil. The detrimental effects of salt are accentuated in regions where evaporation exceeds precipitation, i.e., in arid regions, because evaporation wicks salt to the surface of the soil, and the salt is not flushed away through precipitation, such as rainfall, as it is in less arid regions.

There are a number of conventional techniques that may be employed to mitigate the foregoing contamination of soil. For example, as a preventative measure when a produced water spill occurs, vacuum trucks may be utilized to remove contaminated water from the soil before the water enters the soil. While such use of vacuum trucks is somewhat effective as a preventative measure, some contaminated water will inevitably still enter and contaminate the soil.

Once contaminants have entered the soil, the contaminants may be removed by excavating the soil, washing and flushing the soil, and restoring the soil to the ground. Such a process, however, is very expensive and, for most applications, is cost prohibitive. Alternatively, amendments such as gypsum may be mixed into the soil to convert contaminants, such as sodium chloride salt (NaCl), into less detrimental substances. The converted contaminants, however, may still be detrimental, albeit less detrimental, to the soil. Furthermore, because amendments do not rid the soil of the elements of the contaminants, it is possible that at some point in time the elements could be converted back into the original contaminants.

Therefore, what is needed is a process to economically decontaminate soil, particularly in arid regions, by removing contaminants from the soil.

SUMMARY OF THE INVENTION

The present invention provides a process to economically decontaminate soil, particularly in arid regions, by removing water-soluble contaminants from the soil.

The process for removing water-soluble contaminates from soil includes laying a mat over and in contact with the contaminated soil, applying water to the soil, permitting the water to be transferred from the soil to the mat, permitting the contaminants to be carried via the water into the mat, and permitting the water to be evaporated from the mat so that the contaminants precipitate in the mat.

DETAILED DESCRIPTION

Figure 1:
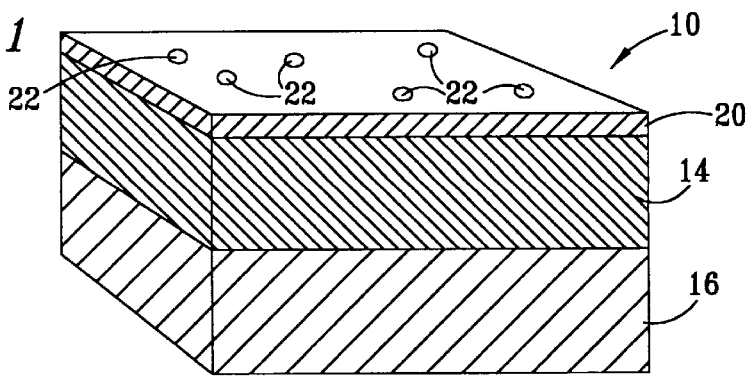
FIG. 1 is a perspective view of an embodiment of the present invention.

In the discussion of the Figures, the same reference numerals will be used throughout to refer to the same or similar components.

Referring to FIG. 1 of the drawings, the reference numeral 10 generally designates an embodiment utilized by a process of the present invention for decontaminating soil. The embodiment 10 includes a layer of surface soil 14 which has a thickness of up to about sixteen inches, and which is generally laden with water-soluble contaminants dispersed therein. The contaminants may comprise any of a number of different salts, such as sodium sulfate salts ($Na_2SO_4$), sodium chloride (NaCl), and also acids, bases, metals, and the like. The surface soil 14 overlies a layer of relatively uncontaminated subsoil 16.

A mat 20 is laid over the contaminated surface soil 14, and comprises a natural or manmade permeable absorbent hydrophilic material such as a melt blown hydrophilic polypropylene or, preferably, woven polypropylene homopolymer material such as is manufactured by American Engineering Fabrics, Inc. (AEF) and identified as AEF Non-woven Staple Fiber for AEF Absorbents, CAS Number 9003-07-0, commercially available in 10×100 foot rolls through Impact Absorbent Technologies, P.O. Box 1131, Atascadero, Calif. 93423. The mat 20 is configured with a suitable thickness, from about 0.010 to about 1.000 inch, and typically from about 0.050 to about 0.500 inches, and preferably about 0.125 inches, depending on the quantity of salt to be removed, it being understood that as the thickness of the mat increases, the capacity of the mat to receive and contain contaminants increases. A suitable weighting material 22, such as pea gravel, is positioned on the mat 20 to secure the mat in direct contact with the surface soil 14.

Figure 1A:
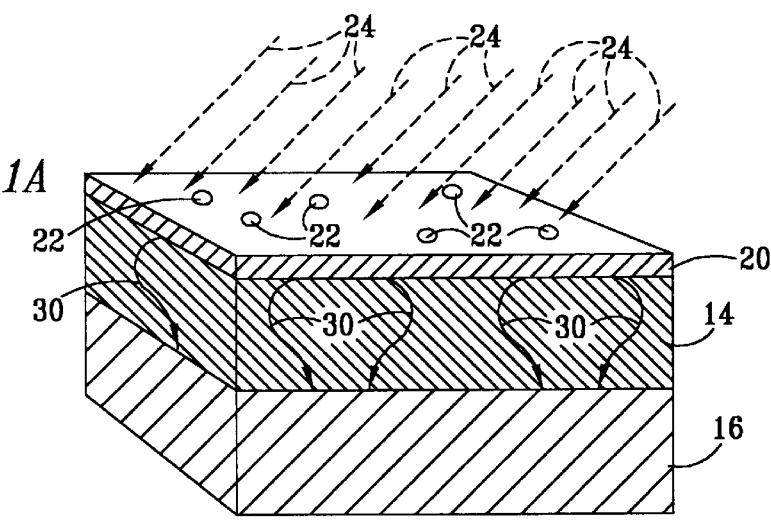
FIG. 1A is a perspective view of the embodiment of FIG. 1 undergoing a first phase of a process of the present invention.
Figure 1B:
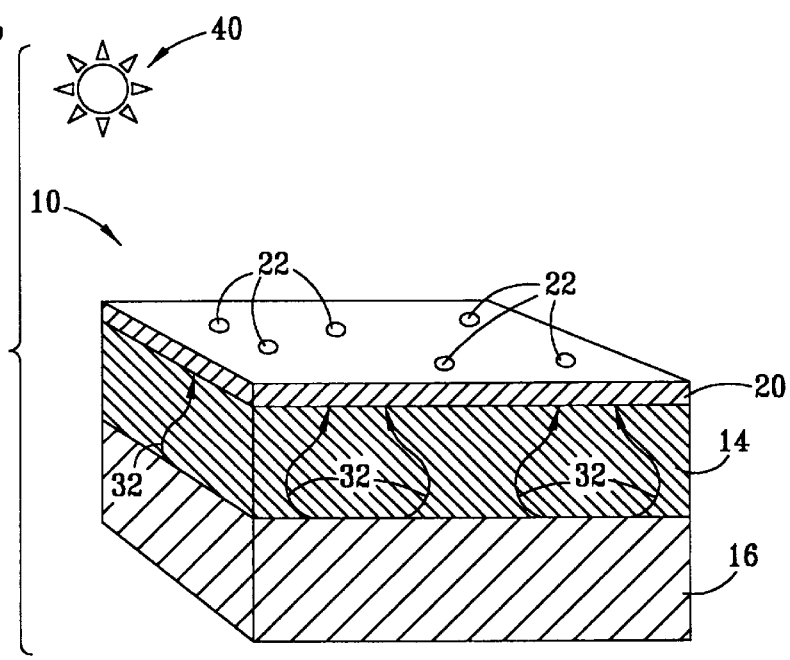
FIG. 1B is a perspective view of the embodiment of FIG. 1 undergoing a second phase of the process of the present invention.
Figure 1C:
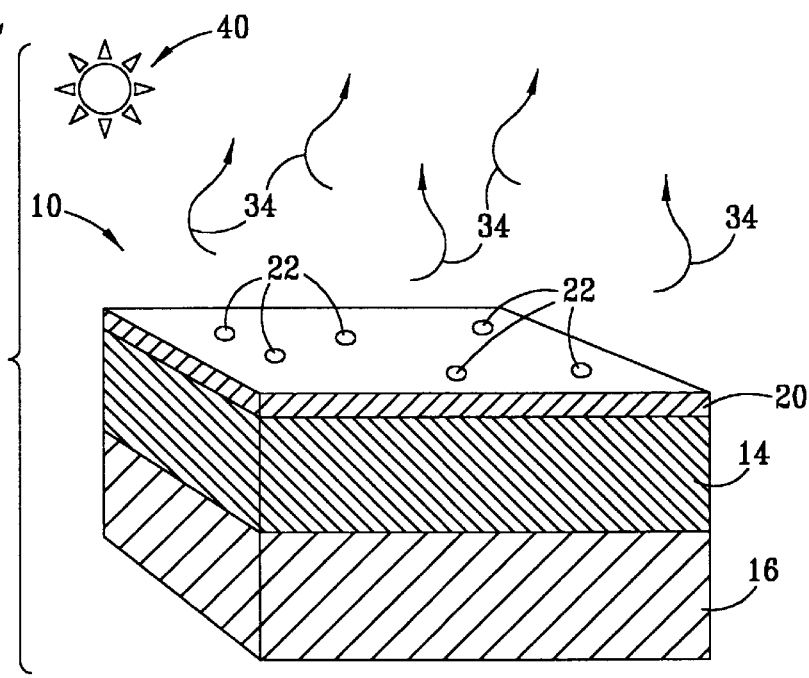
FIG. 1C is a perspective view of the embodiment of FIG. 1 undergoing a third phase of the process of the present invention.

According to the process of the present invention, when the surface soil 14 has been contaminated, the mat 20 is rolled out and laid over the surface soil and secured in direct contact with the soil by positioning the weighting material 22 on the mat. The contaminants 18 in the surface soil 14 are then removed from the soil via a process comprising three phases which are depicted in FIGS. 1A–1C. Accordingly, as shown in FIG. 1A, relatively uncontaminated water is applied to the mat 20 through natural rainfall, irrigation, or the like, as shown by arrows 24. As depicted by the arrows 30, the water soaks through the mat 20, and enters into and saturates the surface soil 14.

With reference to FIG. 1B, after the surface soil 14 has been saturated with the water (not shown in FIG. 1B), the mat 20 and the surface soil 14 are exposed to heat radiated from the sun, designated by the reference numeral 40. As a result of normal hydrostatic wicking action and evaporative action induced by heat from the sun 40, the water and water-soluble contaminants carried by the water are absorbed from the surface soil 14 into the mat 20, as indicated by the arrows 32.

As shown in FIG. 1C, heat radiated from the sun 40 evaporates the water (not shown in FIG. 1C) from the mat 20 into the air, as depicted by the arrows 34. As the water evaporates from the mat 20, the water-soluble contaminants carried by the water into the mat 20 remain in the mat 20 as precipitate. As shown in FIG. 1C, the transfer of water-soluble contaminates from the surface soil 14 to the mat 20 leaves the surface soil relatively free of the contaminates, much like the relatively uncontaminated subsoil 16.

After the contaminates have been transferred to the mat 20, the mat may be disposed of and, if desired, replaced with a new, uncontaminated mat. Alternatively, the mat 20 may be cleaned by flushing contaminants from the mat, and then reusing it.

The present invention has several advantages. For example, it provides for the economic removal of contaminates from soil. Additionally, it capitalizes on the environmental conditions of arid regions, where contaminants, especially salt, are most detrimental to soil, to remove the contaminants from the soil.

It is understood that the present invention can take many forms and embodiments. The embodiments described herein are intended to illustrate rather than to limit the invention. Accordingly, several variations may be made in the foregoing without departing from the spirit or the scope of the invention. For example, the mat 20 may comprise materials other than polypropylene, provided the material is suitably porous and hydrophilic. In another variation, a plurality of mats 20 may be used in combination as necessary to cover areas larger than the area covered by a single mat 20.

Figure 2:
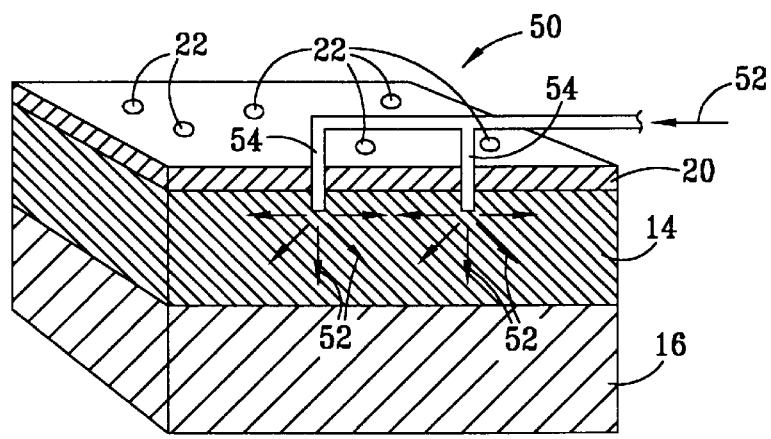
FIG. 2 is a perspective view of an alternate embodiment of the present invention comprising injection tubes.
Figure 3:
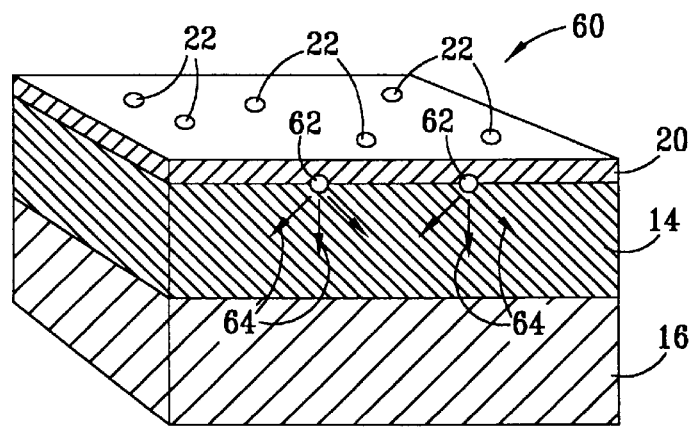
FIG. 3 is a perspective view of an alternate embodiment of the present invention comprising a soaker hose interposed between the soil and a mat.
Figure 4:
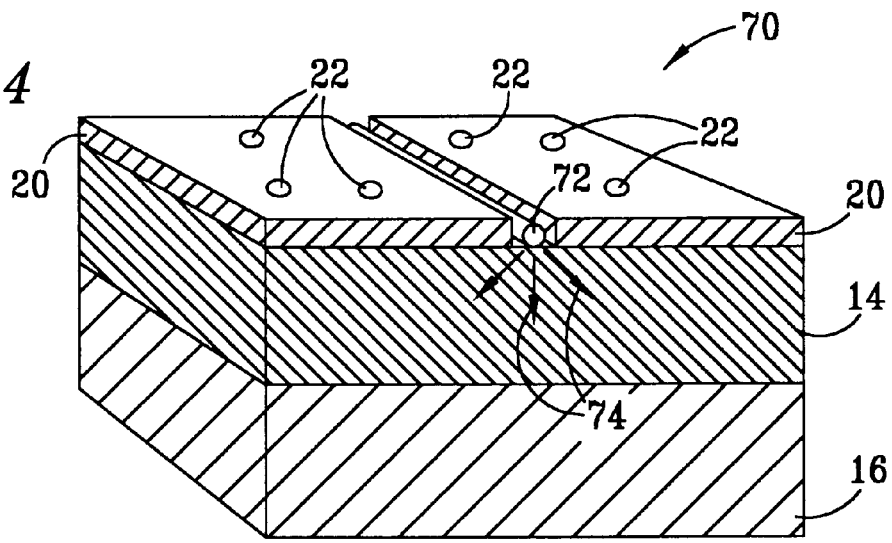
FIG. 4 is a perspective view of an alternate embodiment of the present invention comprising a soaker hose interposed between spaced mats.

In still another variation of the present invention, the surface soil 14 may be watered without passing water through the mat, so that water does not carry any contaminants in the mat downwardly into the soil. This may be achieved, for example, by watering the soil 14 before the mat 20 is laid over the soil; or, as shown in FIG. 2, in an embodiment 50, by distributing water, shown by arrows 52, into the soil 14 through injection tubes 54 positioned in the soil; or, as shown in FIG. 3, in an embodiment 60, by positioning a soaker hose 62 between the soil 14 and the mat 20 and distributing water, shown by arrows 64, through the soaker hose 62 into the soil; or, as shown in FIG. 4, in an embodiment 70, by spacing apart a plurality of mats 20 and positioning a soaker hose 72 between the mats 20 and distributing water, shown by arrows 74 through the soaker hose 72 into the soil; or the like. Except for the application of water to the soil through the injection tubes 54 or through the soaker hoses 62 or 72, described above, operation of the embodiments 50, 60, and 70 is similar to the operation of the embodiment 10 depicted in FIGS. 1A–1C, and will not be described further.

Figure 5:
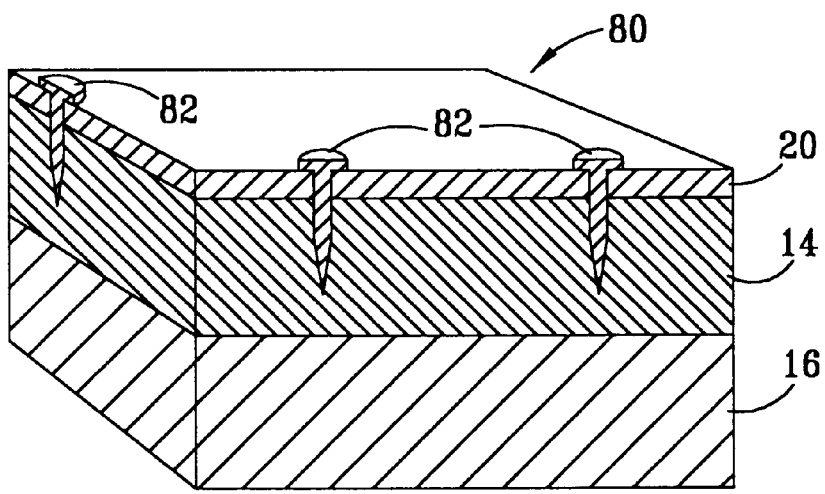
FIG. 5 is a perspective view of an alternate embodiment of the present invention comprising spikes for securing a mat in place.

Yet another variation of the present invention is depicted in an embodiment 80, shown in FIG. 5, which is similar to the embodiment 10. In the embodiment 80, the mat 20 is secured in direct contact with the surface soil 14 with spikes 82, such as nails, rather than the weighting material 22. A mat 20 sized at 10×50 foot, for example, may be held in contact with the surface soil 14 using a suitable number of spikes distributed around the perimeter and center of the mat. Operation of the embodiment 80 is similar to the operation of the embodiment 10 depicted in FIGS. 1A–1C, and will not be described further.

Although illustrative embodiments of the invention have been shown and described, a wide range of modifications, changes, and substitutions are contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A process for removing water-soluble contaminates from contaminated soil, the process comprising the steps of:

laying absorbent material over and in contact with the contaminated soil;

applying water to the soil;

permitting the water to transfer from the soil into the absorbent material;

permitting the contaminants to be carried via the water into the absorbent material; and permitting the water to evaporate from the absorbent material so that the contaminants precipitate in the absorbent material.

2. The process of claim 1 wherein the step of transferring comprises wicking the water from the soil into the absorbent material.

3. The process of claim 1 wherein the absorbent material is hydrophilic.

4. The process of claim 1 wherein the step of applying water to the soil comprises irrigating the soil with water.

5. The process of claim 1 wherein the step of applying water to the soil is performed without passing the water through the absorbent material.

6. The process of claim 5 wherein the step of applying water to the soil comprises positioning a soaker hose between the soil and the absorbent material and distributing the water through the soaker hose into the soil.

7. The process of claim 5 wherein the step of laying absorbent material comprises laying a plurality of mats over and in contact with the contaminated soil in a spaced arrangement, and wherein the step of applying water to the soil comprises laying a soaker hose on the soil between the mats and distributing the water through the soaker hose into the soil.

8. The process of claim 5 wherein the step of applying water to the soil comprises distributing the water through injection tubes positioned in the soil.

9. The process of claim 1 further comprising the step of replacing absorbent material containing the contaminants with fresh absorbent material.

10. The process of claim 1 further comprising the steps of removing the absorbent material from the soil, cleaning the material, and laying the cleaned absorbent material on the soil.

11. The process of claim 1 further comprising the step of securing the mat in contact with the soil.

12. The process of claim 11 wherein the step of securing comprises laying weights on the absorbent material.

13. The process of claim 11 wherein the step of securing comprises driving spikes through the absorbent material into the soil.

14. The process of claim 1 wherein the step of applying water is performed before the step of laying absorbent material.

15. The process of claim 1 wherein the step of laying absorbent material is performed before the step of applying water.

\* \* \* \* \*